Patented Feb. 12, 1929.

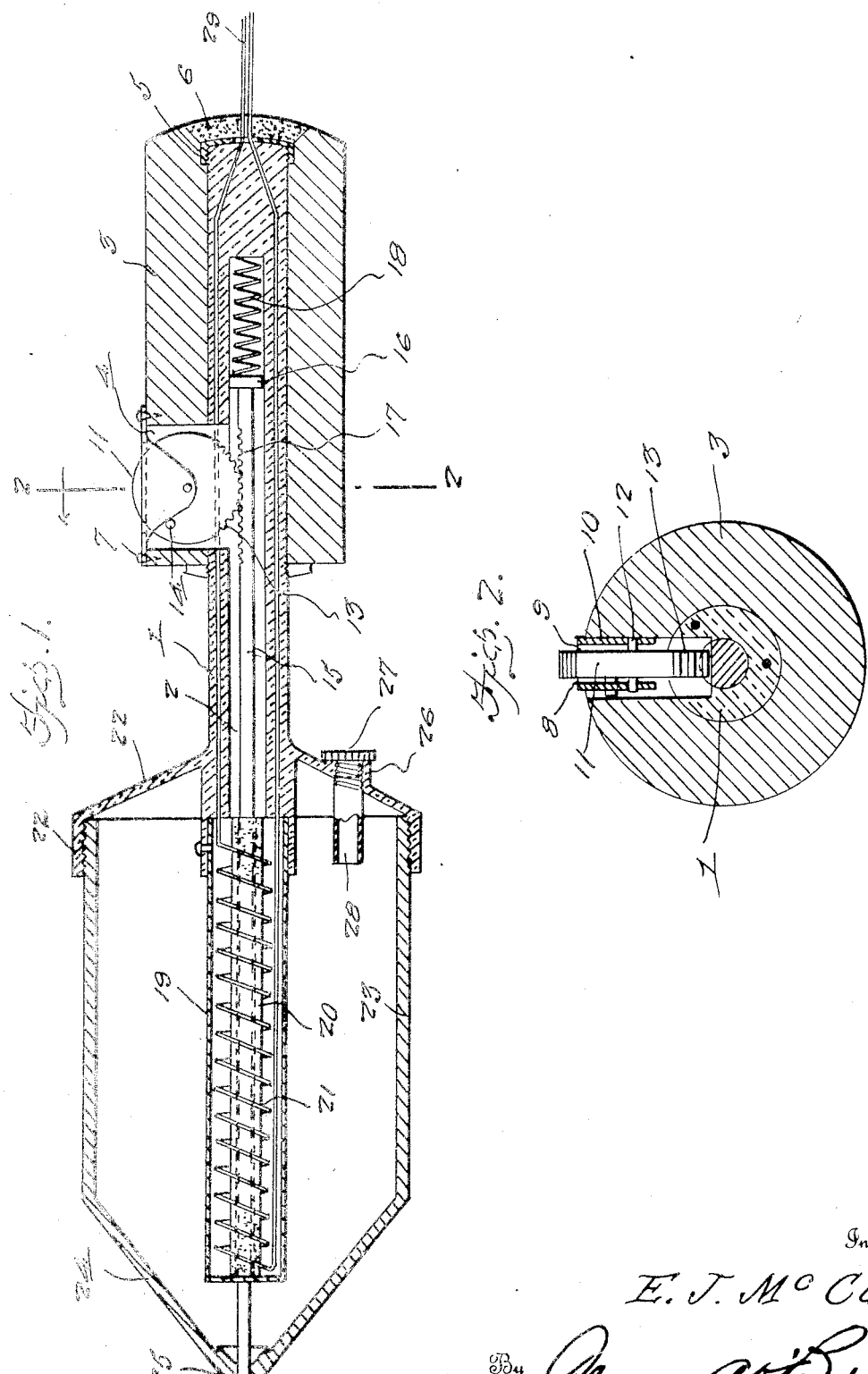

1,701,894

UNITED STATES PATENT OFFICE.

EDWIN JOHN McCUE, OF BROOKLYN, NEW YORK.

ELECTRICAL SOLDERING DEVICE.

Application filed February 11, 1928. Serial No. 253,611.

The present invention relates to improvements in soldering devices and the same pertains more particularly to a soldering tool constructed with a chamber in which solder of a granular or solid nature may be placed and heated to a melted consistency by electrical means. This invention contemplates the provision of a tool wherein novel means is employed for controlling the melted solder, and further involves certain details peculiar to the character of this particular type of implement.

One of the main objects of this device resides in the means provided for quickly heating the soldering material without any inconvenience to the person operating the device.

Still another object is realized from the provisions made, whereby the several parts of the device may be disassembled for the purpose of repair or replacement.

A further object is to provide a simple and easily operable device of the character mentioned, which has means whereby the flow of melted solder may be controlled by the thumb of the hand in which the operator grips this device.

Other novel objects and advantages of the invention will become apparent as the same is better understood from the specification and claims to follow.

In the drawings:

Figure 1 represents a longitudinal sectional view through the tool and disclosing certain novel details of construction, and Figure 2 represents a cross sectional view taken substantially on the line 2—2 of Figure 1.

Now, for a more detailed disclosure of this invention, reference is made to the drawings, wherein like numerals designate like parts. An elongated cylindrical body 1 of insulating material is formed with a bore 2, extending inwardly from one end thereof and terminating at a point inwardly from the opposite end thereof. This body is equipped with a handle 3 at its outer end portion which is formed with a slot 4 adjacent its inner end, which slot is adapted to register with the slot of like dimension formed in the insulating body 1, as is clearly shown in Figure 1. The outer end of the handle is formed centrally with an opening in which is seated an internally threaded cap 5, adapted for threaded relation with the threaded end of the cylindrical body 1, for the obvious purpose of retaining the same within the handle. A suitable cement 6 is employed to fill up this opening and to retain the internally threaded cap 5 in the position illustrated.

Arranged over the opening 4 and secured to the handle 3 by suitable screws 7 is a plate 8, formed with a longitudinal slot 9. At each side of this slot a flange 10 depends into the opening 4. A wheel 11 is provided with an axial pin 12, projecting at opposed sides of the wheel and journaled in the respective flanges 10. This wheel is mounted with respect to the flanges 10 in such a manner as to allow a portion thereof to protrude upwardly through the slot 9 in the plate 8. The peripheral portions of the wheel normally exposed through the portion 9 are preferably knurled, while the substantial portions of the wheel are provided with peripheral teeth 13. A lug 14 projects from one side of the wheel so as to engage the edge of the adjacent flange 10 to limit the rearward movement of the wheel.

A plunger rod 15 has one end portion thereof slidable in the bore 2 of the insulating body. This rod is provided at its inner end with the plunger head 16 while the rack section 17 is formed on the rod at a point inwardly from the plunger and is adapted for meshed relation with the toothed section 13 of the wheel. The plunger 16 is adapted to snugly engage the interior of the body 1 and to normally accord the outward projection of the rod 15 by reason of the tension of the spring 18 against the outer face thereof.

The shell 19 being closed at its outer end has its inner open end secured to the open end of the insulating body 1. Arranged longitudinally within this shell is a tube 20 of insulating material around which an electrical resistance wire 21 is formed to provide a heating element. The closed end of the shell 19 is formed with an opening, while the rod 15 is slidable through the insulating tube 20 and the opening in the closed end of the shell 19 and further adapted to project a substantial distance beyond the closed end of the shell 19, in the manner shown.

The body 1 is provided adjacent its open end with a circumferentially extended conical plate 22, provided at its periphery with a forwardly disposed circumferential flange 23. This flange is internally threaded and adapted to thread to the externally threaded end portion of a tubular barrel 23. This barrel is formed at its forward end in a substantially conical shape as at 24, and has an opening 25 at the apex thereof. As is clearly shown in Figure 1, the outer end portion of the rod 15 is adapted to normally close this opening against the flow of melted solder within the barrel 23. The conical plate 22 is preferably formed with an outstanding internally threaded hollow boss 26, into which is to be threaded the threaded nipple of the cap 27. A tube 28 projects from this threaded nipple into the barrel 23, so that when the barrel is being filled with the solder material, the amount of solder within the barrel may be determined by its level in the tube 28.

In the use of this device, the barrel 23 is first filled through the tube 28, after which an electrical current is switched through the conductor wires 29, to the heating coil 21. When the soldering material has reached a melted state, the wheel 11 is moved forwardly, obviously resulting in the rearward movement of the rod 15. A sufficient movement of the rod 15 will result in the opening of the barrel 23, whereby the melted solder may be displaced onto the work to be mended. When a sufficient amount of the solder has been dispensed by releasing the wheel 11, the tension of the spring 18 will cause the outward movement of the rod 15 again resulting in the closing of the opening 25.

The present invention provides a very simple soldering tool, wherein a heating means is provided for melting a quantity of solder, which provision obviously renders the device capable of being employed for an indefinite length of time, without setting the same aside for any other purpose than to replenish the supply of solder.

Having thus described the invention, what is claimed as new is:

1. In a soldering device of the character described, an insulating tubular body, a handle on one end of the body, a solder container at the opposite end of the body, said container being formed with a discharge opening, said handle and body being formed with registering openings, a plunger operable within the tubular body and container, tensional means for normally maintaining the plunger in closed relation with the discharge opening in the container, and a movable member arranged within the opening of the handle and adapted to project inwardly through the registering opening of the body for cooperation with the plunger for moving the same from closed association with the discharge opening of the container, said movable member consisting of a rotary element having a portion of its periphery provided with teeth, and a plurality of teeth on the plunger adapted for mesh with the teeth of the rotary element.

2. In a soldering device of the class described, comprising an insulating tubular body, a handle on one end of the body, a removable solder container at the opposite end of the body, a heating element extending longitudinally from the container end of the body and being adapted for disposition within the container when the latter is in attached position, and a casing for said heating element.

3. In a soldering device of the character described, comprising an insulating tubular body, a handle on one end of the body, a tubular solder container removably attached to the opposite end of the body, the outer end of said container being constricted and formed with an opening in the reduced end thereof, a heating element holder extending longitudinally from the container end of the body and adapted for disposition within the container when the latter is in attached position, a casing for said heating element holder, and a valve member operable through said hollow holder for engagement within the opening at the constricted end of the container for regulating the flow of solder therethrough.

In testimony whereof I affix my signature.

EDWIN JOHN McCUE.